United States Patent
Innami

(10) Patent No.: US 7,948,893 B2
(45) Date of Patent: May 24, 2011

(54) MOBILE COMMUNICATION SYSTEM, BASE STATION DEVICE AND METHOD OF ESTIMATING NUMBER OF UPLINK PACKET RETRANSMISSIONS THEREOF

(75) Inventor: Takaharu Innami, Tokyo (JP)

(73) Assignee: NEC Corporation, Tokyo (JP)

( * ) Notice: Subject to any disclaimer, the term of this patent is extended or adjusted under 35 U.S.C. 154(b) by 812 days.

(21) Appl. No.: 11/870,777

(22) Filed: Oct. 11, 2007

(65) Prior Publication Data
US 2008/0095094 A1    Apr. 24, 2008

(30) Foreign Application Priority Data

Oct. 18, 2006   (JP) ................................ 2006/283210

(51) Int. Cl.
*H04L 12/26* (2006.01)
(52) U.S. Cl. ....................................................... 370/235
(58) Field of Classification Search .................. None
See application file for complete search history.

(56) References Cited

U.S. PATENT DOCUMENTS

| 7,668,192 B2 * | 2/2010 | Malkamaki et al. | 370/455 |
| 2005/0249138 A1 * | 11/2005 | Heo et al. | 370/311 |
| 2005/0265301 A1 * | 12/2005 | Heo et al. | 370/349 |

FOREIGN PATENT DOCUMENTS

JP    2003189368    7/2003

* cited by examiner

*Primary Examiner* — Anh-Vu Ly

(57) ABSTRACT

This invention provides a mobile communication system wherein a base station device receives a MAC (Medium Access Control)-e PDU (Protocol Data Unit) from a mobile terminal using a HARQ (Hybrid Acknowledge Request) system, the base station device including:
a modulating/demodulating portion that estimates the number of processes used by the mobile terminal using a TBES (Total E-DCH Buffer Status) of an E-DPCH [E-DCH (Enhanced CHannel) Dedicated Physical CHannel].

13 Claims, 5 Drawing Sheets

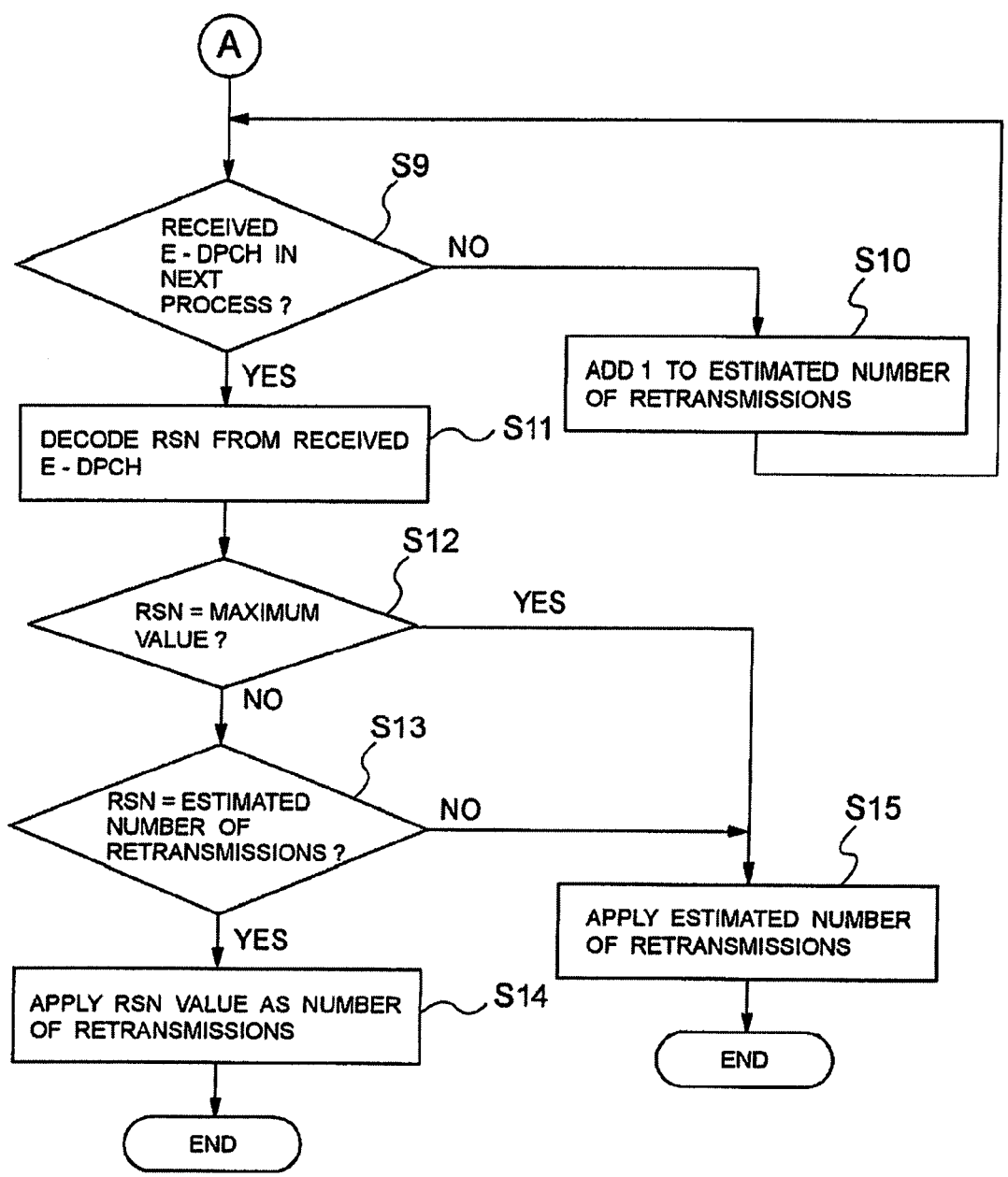

MOBILE COMMUNICATION SYSTEM, BASE STATION DEVICE AND METHOD OF ESTIMATING NUMBER OF UPLINK PACKET RETRANSMISSIONS THEREOF

INCORPORATION BY REFERENCE

This application is based upon and claims the benefit of priority from Japanese patent applications No. 2006-283210, filed on Oct. 18, 2006, the disclosure of which is incorporated herein its entirety by reference.

BACKGROUND OF THE INVENTION

1. Field of the Invention

This invention relates to a mobile communication system, a base station device and a method of estimating a number of uplink packet retransmissions, and particularly relates to a method of estimating a number of uplink packet retransmissions of HSUPA (High-Speed Uplink Packet Access) in the base station device.

2. Description of the Related Art

For a base station device, it is important to measure the radio quality. A method of measuring the radio quality includes a method of measuring the number of NACK (Negative ACKnowledgement) messages to be transmitted and requesting retransmission when an error in received data is serious.

However, it is assumed for the method that a base station device can receive an E-DPCH [E-DCH (Enhanced Dedicated CHannel) Dedicated Physical CHannel]. Because of this, it is not considered for the method that a base station device cannot receive the E-DPCH even if a mobile terminal transmits the E-DPCH.

That is, the radio quality can be measured by measuring an E-DPCH carrying a MAC (Medium Access Control)-e PDU (Protocol Data Unit) transmitted from a mobile terminal by including its retransmission, and comparing the result to the number of MAC-e PDUs received actually. Therefore, it is necessary to measure the number of MAC-e PDUs transmitted from a mobile terminal.

In a mobile communication system as in the above, a method has been proposed of monitoring and grasping a PDU transmission state in a radio link to a mobile terminal for each call, calculating a retransmission occurrence rate as an evaluated value of the radio transmission quality, and determining the radio transmission quality as a deteriorated state if the retransmission occurrence rate is a threshold or more (for example, see patent document 1 (Japanese Patent Laid-Open No. 2003-189368)).

Since the related base station device described in the above cannot measure an E-DPCH that has not been received, it actually grasps the number of retransmissions using an RSN (Retransmission Sequence Number) value indicated to a MAC-e PDU when it receives an E-DPCH.

However, an RSN value can be an error and is finite so that it has the maximum value that can be displayed. Because of this, an RSN value does not always indicate the correct number of retransmissions.

An error rate can be high due to the state of the radio environment when a mobile terminal transmits an E-DPCH. So an E-DPCH cannot be received, or a base station device might not be able to decode a MAC-e PDU accurately even if it receives an E-DPCH.

In the above case, the mobile terminal retransmits the MAC-e PDU in the same process in the next cycle. An HSUPA signal modulating/demodulating device could not know the normal number of retransmissions 1) if it cannot decode the RSN normally and 2) if the maximum allowed times of retransmissions larger than the RSN is set and the RSN is reported as the maximum value to which the RSN can be set. The technique according to the above patent document 1 cannot solve the problem.

SUMMARY

An exemplary object of the invention is to provide a mobile communication system, a base station, a method of estimating the number of uplink packet retransmission for a mobile communication system and a recording medium that solve the above problem and can accurately count the number of HSUPA E-DCH MAX-e PDUs transmitted from a mobile terminal.

An exemplary aspect of the invention is a mobile communication system wherein a base station device receives a MAC (Medium Access Control)-e PDU (Protocol Data Unit) from a mobile terminal using a HARQ (Hybrid Acknowledge Request) system, the base station device including:

a modulating/demodulating portion that estimates the number of processes used by the mobile terminal using a TBES (Total E-DCH Buffer Status) of an E-DPCH [E-DCH (Enhanced CHannel) Dedicated Physical CHannel].

An exemplary aspect of the invention is a base station device that receives a MAC (Medium Access Control)-e PDU (Protocol Data Unit) from a mobile communication system using a HARQ (Hybrid Acknowledge Request) system in a mobile communication system, the base station device including:

a modulating/demodulating portion that estimates the number of processes used by the mobile terminal using a TBES (Total E-DCH Buffer Status) of an E-DPCH [E-DCH (Enhanced Dedicated CHannel) Dedicated Physical CHannel).

An exemplary aspect of the invention is a method of estimating the number of uplink packet retransmissions for a mobile communication system wherein a base station device receives a MAC (Medium Access Control)-e PDU (Protocol Data Unit) from a mobile terminal using a HARQ (Hybrid Acknowledge Request) system, the method of estimating the number of uplink packet retransmissions including in the base station:

executing the treatment of estimating the number of processes used by the mobile terminal using a TBES (Total E-DCH Buffer Status) of an E-DPCH (E-DCH [Enhanced Dedicated CHannel) Dedicated Physical CHannel].

An exemplary aspect of the invention is a recording medium that records a program executed by a base station device in a mobile communication system wherein the base station device receives a MAC (Medium Access Control)-e PDU (Protocol Data Unit) from a mobile terminal using a HARQ (Hybrid Acknowledge Request) system, the program causes:

a central processing unit of the base station device to execute the treatment of estimating the number of processes used by the mobile terminal using a TBES (Total E-DCH Buffer Status) of an E-DPCH [(E-DCH (Enhanced Dedicated CHannel) Dedicated Physical CHannel].

BRIEF DESCRIPTION OF THE DRAWINGS

FIG. 5 is a flowchart showing the operation of an HSUPA signal modulating/demodulating portion in FIG. 1.

EXEMPLARY EMBODIMENT

Figure 1:
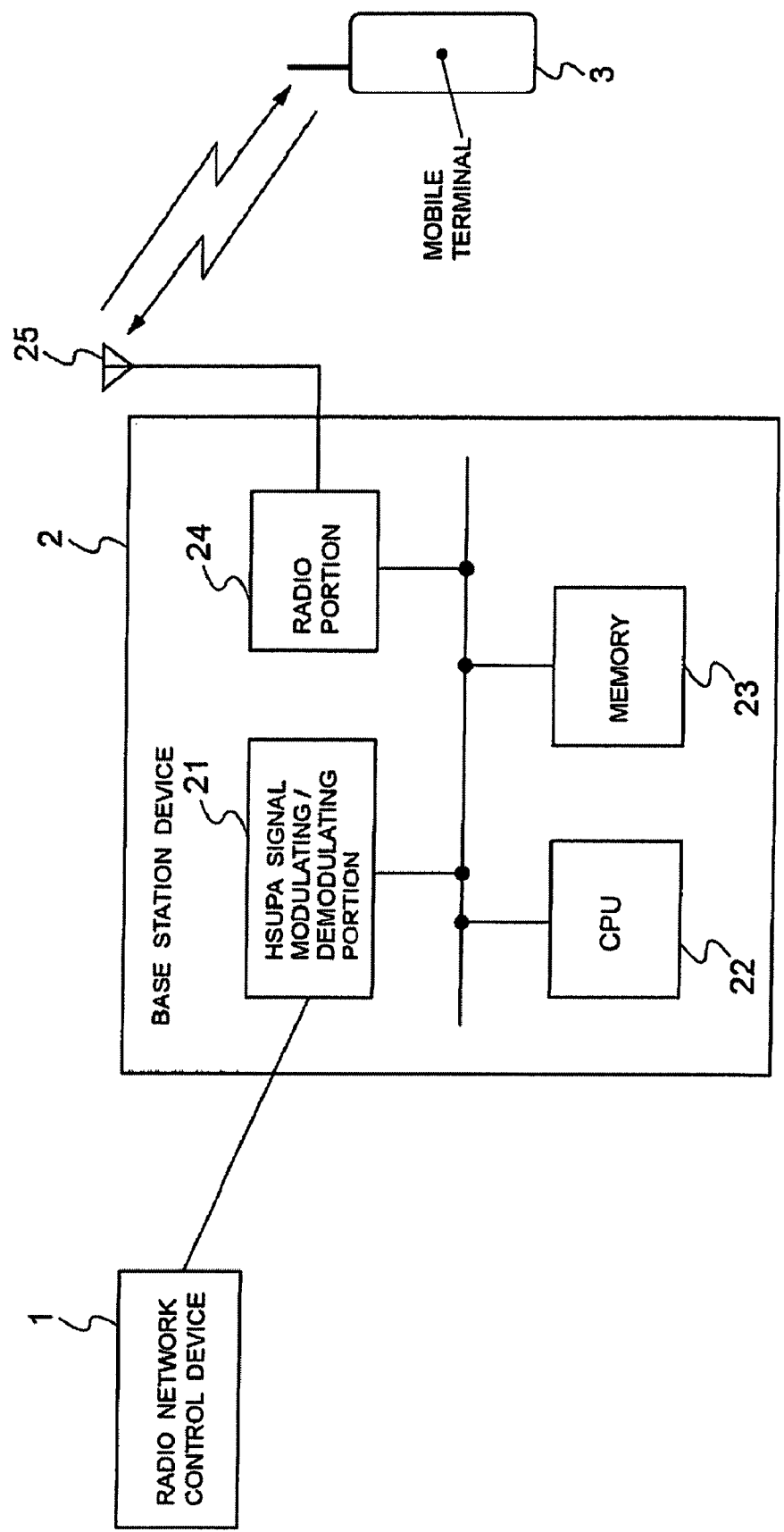
FIG. 1 is a block diagram showing configuration of a mobile communication system according to an exemplary embodiment of the invention.

As described in the above, in the mobile communication system according to the invention, the HSUPA (High-Speed Uplink Packet Access) signal modulating/demodulating portion of the base station device can know the buffer status of the mobile terminal from the TEBS (Total E-DCH Buffer Status) displayed by a HARQ control indicator of the E-DPCCH [E-DCH (Enhanced Dedicated CHannel) Dedicated Physical Control CHannel] in the environment in which the base station device receives a MAC (Medium Access Control)-e PDU (Protocol Data Unit) from the mobile terminal using the HARQ (Hybrid Acknowledge Request) system.

The HSUPA signal modulating/demodulating portion assigns a process for causing the mobile terminal to transmit a MAC-e PDU by considering the value, so that it can previously expect a process to receive the MAC-e PDU.

In the case of the above problem 1), if the RSN (Retransmission Sequence Number) cannot be normally decoded when a MAC-e PDU is received in the expected process, it can be determined that retransmission is not executed.

Also in the case of the above problem 1), if a MAC-e PDU is not received in the process expected by the HSUPA signal modulating/demodulating portion, the next process of the same number is expected to receive it. If a MAC-e PDU cannot be received even in the process, a process expected to receive a MAC-e PDU is shifted to a next process of the same number and so on.

If the mobile terminal does not receive an ACK (ACKnowledgement) message from the base station device similarly to the above, it retransmits the MAC-e PDU in the process timing of the next and the same number. The mobile terminal retransmits the MAC-e PDU until it receives an ACK message.

As described in relation to the above problem 2), if the maximum number of retransmissions is prescribed, the retransmission is not performed over the number of times of the value or more. If the MAC-e PDU is not received in a first expected process, but the MAC-e PDU is received in a process a little after the first process, and the RSN cannot be normally decoded in the case of the above problem 1), then the HSUPA signal modulating/demodulating portion can estimate the number of retransmissions by determining the order of the expected process for the actual reception using the first process expected as the point of reference.

In the case of the above problem 2), the field length of the RSN displaying the number of retransmissions between the base station device and the mobile terminal is finite, and the maximum number of retransmissions designated by a radio network control device to the mobile terminal may be larger than the value. Because of this, even if the base station device can receive a MAC-e PDU and decode the RSN, the RSN value may differ from the actual number of retransmissions when the RSN value reports the maximum value that can be displayed. Therefore, the HSUPA signal modulating/demodulating portion can estimate the number of retransmissions by determining the order of the expected process for the actual reception using the first expected process as the point of reference, similarly to the above.

However, if the RSN value is smaller than the maximum value that can be displayed, the value may be used. That is, when the base station device receives the MAC-e PDU transmitted from the mobile terminal, the device finds an expected process, and estimates the number of retransmissions using the process as the point of reference, so that it can count the number of MAC-e PDUs transmitted from the mobile terminal.

As described in the above, the mobile communication system according to the invention can accurately count the number of HSUPA E-DCH MAC-e PDUs transmitted from a mobile terminal in a radio area network including a W-CDMA (Wideband-Code Division Multiple Access) mobile base station device and a radio network control device.

Describing in more detail, in the mobile communication system according to the invention, the radio network control device is connected to the base station device via an ATM (Asynchronous Transfer Mode) line, while the mobile terminal transmits and receives a signal to and from the base station device in a W-CDMA radio access system. The base station device includes the HSUPA signal modulating/demodulating portion. The HSUPA signal modulating/demodulating portion receives an E-DPCH (E-DCH Dedicated Physical CHannel) from the mobile terminal using the HARQ system. The HARQ system is a system that uses a process of a fixed time unit for control, in which a cycle is defined to be a finite process.

An E-DPCH error may be serious depending on the state of the radio environment in communication between the base station device and the mobile terminal, so that the HSUPA signal modulating/demodulating portion could not receive an E-DPCH or normally decode a MAC-e PDU. In that case, the mobile terminal retransmits the MAC-e PDU, while the HARQ system performs the retransmission using the same process. An RSN field is prescribed to indicate the number of retransmissions for a MAC-e PDU. The mobile terminal can display the order of the retransmission at retransmission using the field.

Even if the HSUPA signal modulating/demodulating portion can correctly receive a MAC-e PDU, it could not normally decode the field. Moreover, the length of the RSN field is finite, and actually, the number of retransmissions may be previously allowed that the length of the RSN field cannot display. Therefore, a value displayed in the RSN field does not always display the correct number of retransmissions.

In view of the above problem, the mobile communication system according to the invention provides means of estimating the number of MAC-e PDUs transmitted and retransmitted from a mobile terminal in the HSUPA signal modulating/demodulating portion if an E-DPCH cannot be correctly received, if the RSN field cannot be normally decoded even if an E-DPCH is received, or if the RSN cannot be accurately counted due to limitation on the length of an RSN field, thereby allowing for accurate measurement.

An E-DPCH includes an E-DPCCH containing a control signal and an E-DPDCH (E-DCH Dedicated Physical Data CHannel) containing user data such as a MAC-e PDU. The HSUPA signal modulating/demodulating portion can know the buffer status of a mobile terminal from the TEBS displayed by HARQ control information in an E-DPCCH. The portion considers the status to assign a process for causing the mobile terminal to transmit a MAC-e PDU. Consequently, the HSUPA signal modulating/demodulating portion can previously expect a process to receive a MAC-e PDU.

If the mobile communication system according to the invention does not receive a MAC-e PDU in an expected process, it estimates that a mobile terminal might have transmitted a MAC-e PDU in the process. By this estimation, when the system can normally receive and decode a MAC-e PDU afterward, it detects the accurate number of retransmissions. This allows for the mobile communication system according to the invention to count the accurate number of retransmissions if a MAC-e PDU is retransmitted depending on the state of the radio environment.

The mobile communication system according to the invention can also accurately estimate the number of retransmissions of an actually received MAC-e PDU using a first reception-expected process as the point of reference by applying definition that a period of retransmission of a MAC-e PDU by a mobile terminal is fixed. Therefore, the mobile communication system according to the invention can accurately estimate the number of retransmissions of a MAC-e PDU if it cannot receive an E-DPCH, if it cannot accurately decode the RSN even if it can receive an E-DPCH, or if the RSN displays the maximum value when the maximum number of retransmissions designated by a radio network control device is larger than a value that can be displayed by the RSN.

The invention offers an advantage that the number of HSUPAE-DCH MAC-e PDUs transmitted from a mobile terminal can be accurately counted with the above configuration and operation.

Next, an exemplary embodiment of the invention will be described with reference to the drawings. FIG. 1 is a block diagram showing configuration of a mobile communication system according to an exemplary embodiment of the invention. In FIG. 1, the mobile communication system according to the exemplary embodiment of the invention constitutes a W-CDMA (Wideband-Code Division Multiple Access) radio network and includes a radio network control device 1, a base station device 2 and a mobile terminal 3.

The radio network control device 1 is connected to the base station device 2 via an ATM (Asynchronous Transfer Mode) line. The mobile terminal 3 transmits and receives a signal to and from the base station device 2 in the W-CDMA radio access system. The base station device 2 includes an HSUPA (High-Speed Uplink Packet Access) signal modulating/demodulating portion 21, a CPU (central processing unit) 22 that controls respective portions of the base station device 2, a memory 23 that stores a program executed by the CPU 22 and that is used as a working area when the CPU 22 executes the program, a radio portion 24 and an antenna 25.

The HSUPA signal modulating/demodulating portion 21 receives an [E-DPCH RE-DCH (Enhanced Dedicated CHannel) Dedicated Physical CHannel] from a mobile terminal using a HARQ (Hybrid Acknowledge Request) system. A HARQ system is a system that uses a process of a fixed time unit for control, in which a cycle is defined to be a finite process.

An E-DPCH error may be serious depending on the state of the radio environment in communication between the base station device 2 and the mobile terminal 3, so that the HSUPA signal modulating/demodulating portion 21 could not receive an E-DPCH or normally decode a MAC (Medium Access Control)-e PDU (Protocol Data Unit). In that case, the mobile terminal 3 retransmits the MAC-e PDU, while the HARQ system performs the retransmission using the same process. An RSN (Retransmission Sequence Number) field is prescribed to indicate the number of retransmissions for a MAC-e PDU. The mobile terminal 3 can display the order of the retransmission at retransmission using the field.

Even if the HSUPA signal modulating/demodulating portion 21 can correctly receive a MAC-e PDU, it could not normally decode the field. Moreover, the length of the RSN field is finite, and actually, the number of retransmissions may be previously allowed that the length of the RSN field cannot display. Therefore, a value displayed in the RSN field does not always display the correct number of retransmissions.

In view of the above problem, it is an object of the exemplary embodiment to provide means of estimating the number of MAC-e PDUs transmitted and retransmitted from the mobile terminal 3 in the HSUPA signal modulating/demodulating portion 21 for accurate measurement if an E-DPCH cannot be correctly received, if the RSN field cannot be normally decoded even if an E-DPCH is received, or if the RSN cannot be accurately counted due to limitation on the length of an RSN field.

An E-DPCH includes an E-DPCCH (E-DCH Dedicated Physical Control CHannel) containing a control signal and an E-DPDCH (E-DCH Dedicated Physical Data CHannel) containing user data such as a MAC-e PDU.

The HSUPA signal modulating/demodulating portion 21 can know the buffer status of the mobile terminal 3 from the TEBS (Total E-DCH Buffer Status) displayed by HARQ control information in an E-DPCCH. The portion 21 considers the status to assign a process for causing the mobile terminal 3 to transmit a MAC-e PDU.

Consequently, the HSUPA signal modulating/demodulating portion 21 can previously expect a process to receive a MAC-e PDU. If the portion 21 does not receive a MAC-e PDU in an expected process, it estimates that a mobile terminal might have transmitted a MAC-e PDU in the process. By this estimation, when the system can normally receive and decode a MAC-e PDU afterward, it detects the accurate number of retransmissions. This allows the accurate number of retransmissions in this exemplary embodiment to be counted if a MAC-e PDU is retransmitted depending on the state of the radio environment.

Figure 2:
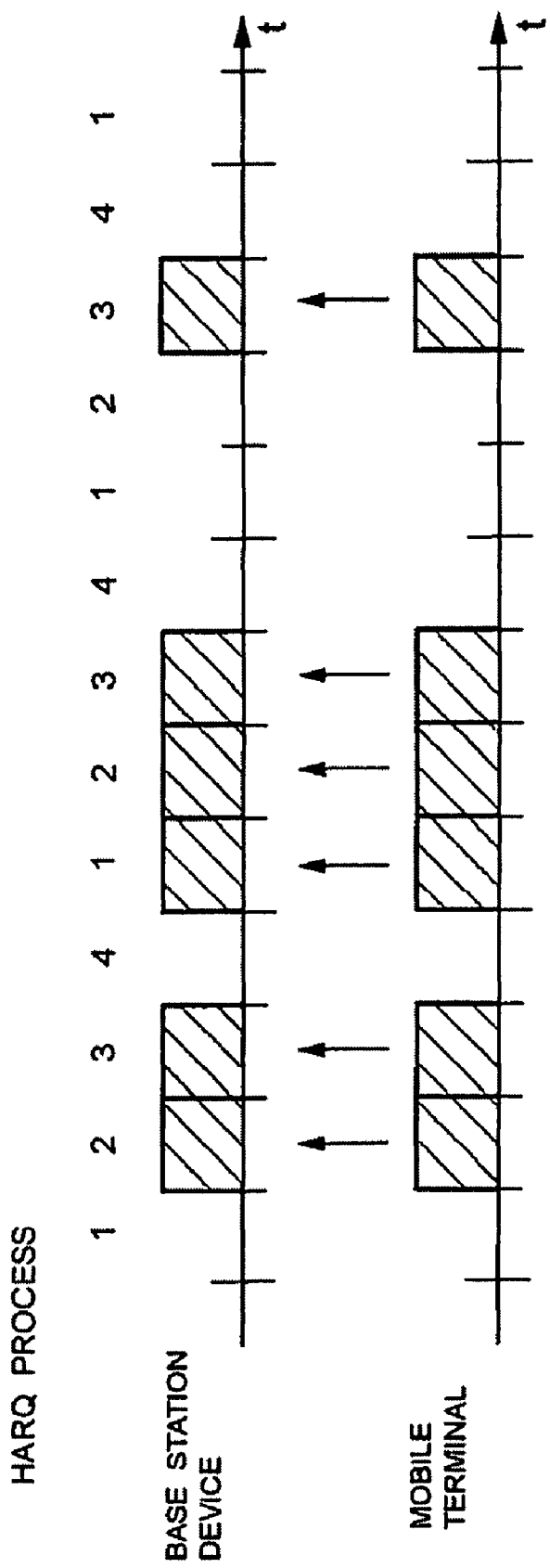
FIG. 2 is a diagram illustrating the operation of the mobile communication system according to the exemplary embodiment of the invention.
Figure 3:
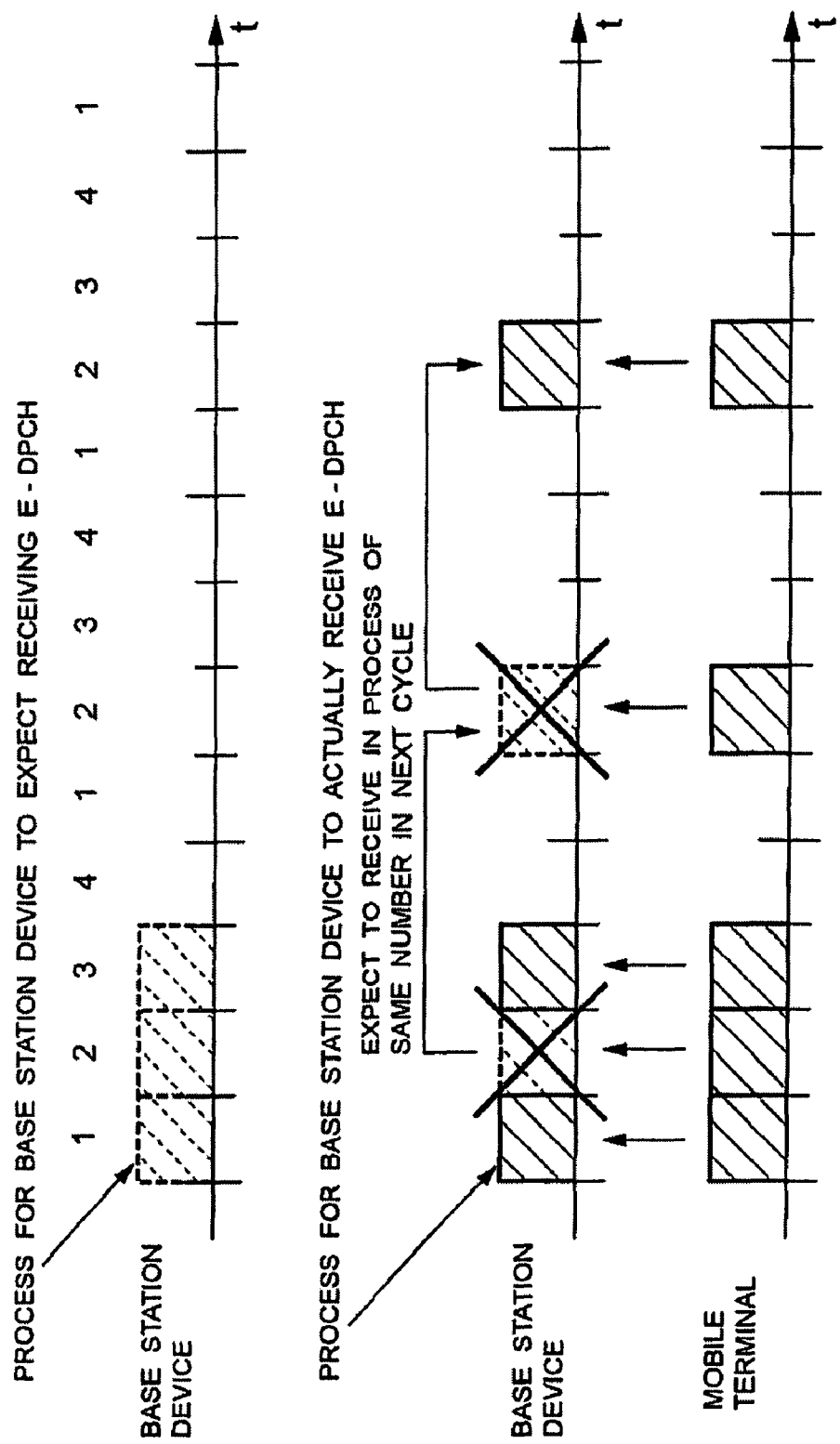
FIG. 3 is a diagram illustrating the operation of the mobile communication system according to the exemplary embodiment of the invention.

FIGS. 2 and 3 are diagrams illustrating the operation of the mobile communication system according to the exemplary embodiment of the invention. FIGS. 2 and 3 show the operation between the base station device 2 and the mobile terminal 3. The base station device 2 includes the HSUPA signal modulating/demodulating portion 21 that supports an HSUPA function. FIGS. 2 and 3 schematically show a sequence of transmission and reception of an E-DPCH between the HSUPA signal modulating/demodulating portion 21 and the mobile terminal 3.

In this exemplary embodiment, a signal is transmitted and received in a cycle consisting of four HARQ processes. The base station device 2 receives an E-DPCH in a HARQ process unit, while the mobile terminal 3 transmits an E-DPCH in a HARQ process unit. The base station device 2 decides a reception-expected process from a TEBS. The mobile terminal 3 transmits an E-DPCH, though the base station device 2 could not receive the E-DPCH. In that case, the base station device 2 expects retransmission in a process of the same number in the next cycle, and the mobile terminal 3 transmits an E-DPCH at that time.

Figure 4:
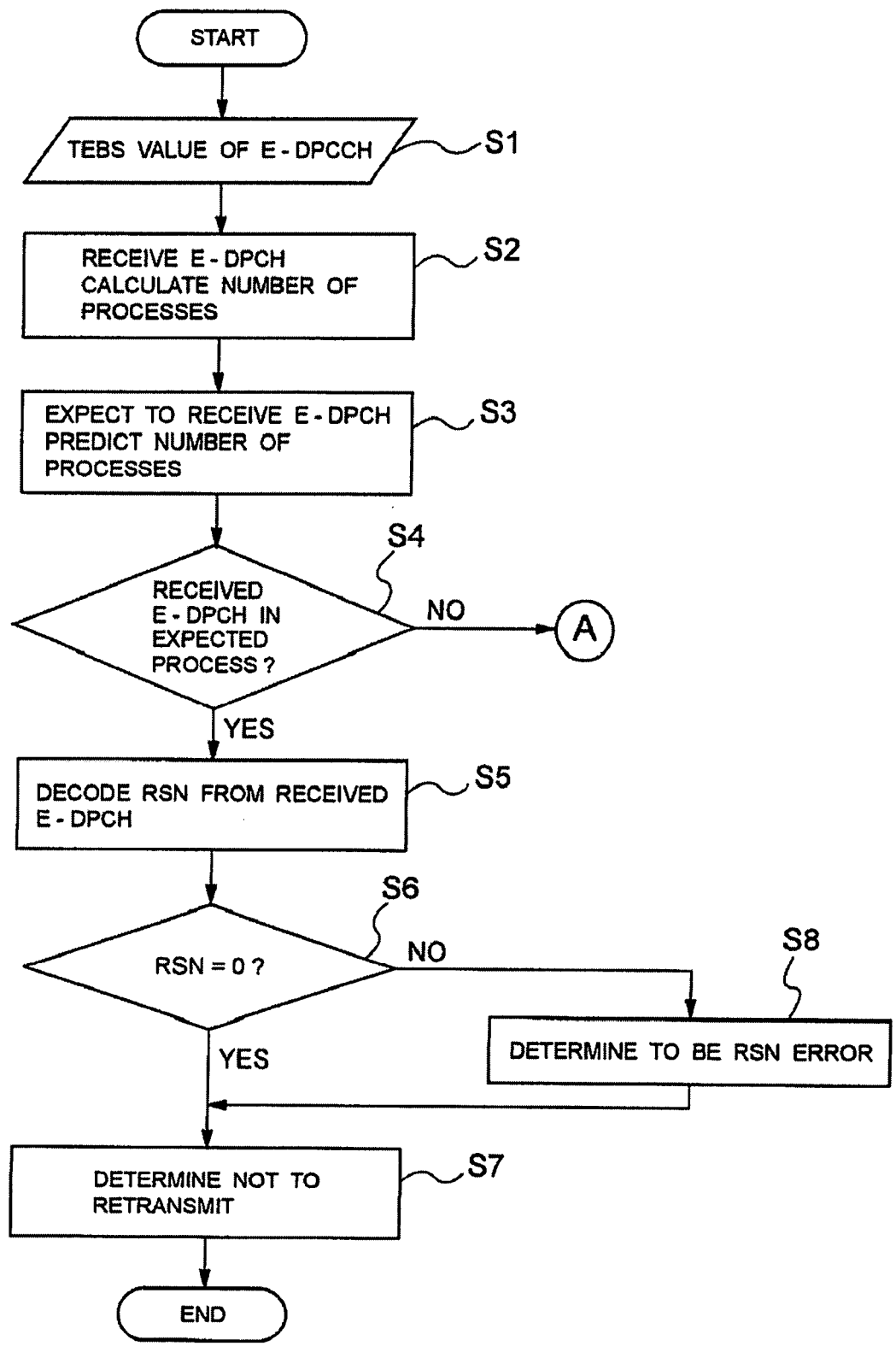
FIG. 4 is a flowchart showing the operation of an HSUPA signal modulating/demodulating portion in FIG. 1.

FIGS. 4 and 5 are flowcharts showing the operation of the HSUPA signal modulating/demodulating portion 21 in FIG. 1. The message flow between the radio network control device 1 and the base station device 2 according to the exemplary embodiment of the invention will be described with reference to FIGS. 1 to 5. In the following description, the operation of the HSUPA signal modulating/demodulating portion 21 shown in FIGS. 4 and 5 can be also realized through execution of a program in the memory 23 by the CPU 22.

The HSUPA signal modulating/demodulating portion 21 can know the buffer status of the mobile terminal 3 from a TEBS displayed in a HARQ control information field of an E-DPCCH transmitted from the mobile terminal 3. In other words, the HSUPA signal modulating/demodulating portion 21 can know how large E-DPDCH is transmitted (steps S1 and S2 in FIG. 4).

The HSUPA signal modulating/demodulating portion 21 can determine, from the value of the TEBS, how many processes should be used to transmit the data of the TEBS on an E-DPDCH, so that it can previously expect a process for reception. Using this ability, the portion 21 finds the expected process (step S3 in FIG. 4). For example, if the data amount displayed using the TEBS corresponds to three processes, processes "1", "2" and "3" are defined as reception-expected processes.

The HSUPA signal modulating/demodulating portion 21 receives an E-DPDCH in the reception-expected processes (step S4 in FIG. 4). If the RSN value is displayed as "0" as expected (steps S5 and S6 in FIG. 4), the portion 21 determines that retransmission is not necessary (step S7 in FIG. 4).

The HSUPA signal modulating/demodulating portion 21 received the E-DPDCH in the reception-expected processes (step S4 in FIG. 4). However, if the portion 21 decodes the RSN value differing from an expected value (steps S5 and S6 in FIG. 4), it determines the value to be an RSN error (step S8 in FIG. 4) and also determines that retransmission is not necessary (step S7 in FIG. 4).

If the HSUPA signal modulating/demodulating portion 21 does not receive an E-DPDCH in the reception-expected processes (step S4 in FIG. 4 and step S9 in FIG. 5), then it adds one to the estimated number of retransmissions (step S10 in FIG. 5), and expects to receive an E-DPDCH in the next process of the same number. Since the mobile terminal 3 cannot receive an ACK (ACKnowledgement) message from the base station device 2 either, it retransmits an E-DPDCH in the next process of the same number.

If the HSUPA signal modulating/demodulating portion 21 cannot receive the retransmitted E-DPDCH even in the retransmission (step S9 in FIG. 5), then it adds one to the estimated number of retransmissions (step S10 in FIG. 5), and expects to receive an E-DPDCH in a process of the same number in a cycle after the next one. The mobile terminal 3 also retransmits an E-DPDCH in a process of the same number after the next one, and increments the RSN value.

The HSUPA signal modulating/demodulating portion 21 receives the E-DPDCH (step S9 in FIG. 5), and decodes a MAC-e PDU (step S11 in FIG. 5). At this time, the portion 21 utilizes the estimated number of retransmissions to determine the order of the process in which it can receive the E-DPDCH using the first expected process as the point of reference. If the RSN value of the MAC-e PDU displays the same value as the estimated number of retransmissions (step S13 in FIG. 5), the HSUPA signal modulating/demodulating portion 21 adopts the RSN value as the number of retransmissions (step S14 in FIG. 5). If the RSN value is decoded as a value differing from the estimated number of retransmissions (step S13 in FIG. 5), then the HSUPA signal modulating/demodulating portion 21 determines that there occurred an error in the decoding stage, and adopts the expected value (the estimated number of retransmissions) (step S15 in FIG. 5).

The field length of the RSN displaying the number of retransmissions between the base station device 2 and the mobile terminal 3 is finite, so that there is limitation on a value that can be displayed. The maximum number of retransmissions designated by the radio network control device 1 may be larger than the value, and the mobile terminal 3 can retransmit an E-DPDCH up to the maximum set number of retransmissions. Because of this, even if the base station device 2 can receive an E-DPDCH and accurately decode the RSN, the RSN value may differ from the actual number of retransmissions when the RSN value reports the maximum value that can be displayed.

The HSUPA signal modulating/demodulating portion 21 can previously determine a reception-expected process similarly to the above case. To grasp the order of an actual reception process that can receive an E-DPDCH using the first reception-expected process as the point of reference, the portion 21 counts the estimated number of retransmissions. If the RSN value of a MAC-e PDU reports the maximum value that can be displayed (step S12 in FIG. 5), the HSUPA signal modulating/demodulating portion 21 adopts the estimated number of retransmissions counted by the portion 21 (step S15 in FIG. 5).

An exemplary advantage according to the invention is that the base station device 2 determines the number of processes to be used by considering the number of MAC-e PDUs transmitted by the mobile terminal 3 from the TEBS, and predicts processes to receive the MAC-e PDUs, in this exemplary embodiment. This allows determination whether or not the RSN value at actual reception of the MAC-e PDUs is correct using the first expected process as the point of reference.

Also in this exemplary embodiment, grasping the order of the expected process that actually received the MAC-e PDU using the predicted expected reception processes as the point of reference can lead to grasping the correct number of retransmissions even if an RSN value is decoded in a wrong way.

Further in this exemplary embodiment, by grasping the order of the expected process that actually received the MAC-e PDU using the predicted expected reception processes as the point of reference, the correct number of retransmissions can be grasped if the maximum number of retransmissions designated by the radio network control device 1 is larger than the maximum value of an RSN value that can be displayed and the received RSN value indicates the maximum value.

The HSUPA signal modulating/demodulating portion 21 determines how many MAC-e PDUs are transmitted from the mobile terminal 3 and decides a reception-expected process from the TEBS. However, the mobile terminal 3 does not always transmit an E-DPDCH using the maximum assigned bytes. That is, there can be difference between the number of MAC-d flows that are actually transmitted and the expected number of MAC-d flows. Because of this, the number of reception-expected processes can also cause difference.

The HSUPA signal modulating/demodulating portion 21 can also grasp the number of MAC-d flows that are actually received in a TFCI (Transport Format Combination Indicator) field of an E-DPDCH. That is, the portion 21 can determine whether or not the mobile terminal 3 has transmitted data as the first expected process, thereby determining a reception-expected process more accurately for flexible addressing.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the claims.

What is claimed is:

1. A mobile communication system comprising a base station device that receives a Medium Access Control (MAC-e) Protocol Data Unit MAC from a mobile terminal using a Hybrid Acknowledge Request (HARQ) system, said base station device comprising: a modulating/demodulating portion that estimates the number of processes used by said mobile terminal using a Total E-DCH Buffer Status (TBES) of an Enhanced Dedicated Physical Channel (E-DPCH) even if the modulating/demodulating portion cannot receive the E-DPCH and/or cannot correctly decode the MAC-e PDU.

2. The mobile communication system according to claim 1, wherein said modulating/demodulating portion predicts a process for said mobile terminal to transmit said E-DPCH, and estimates the number of retransmissions of said MAC-e PDU using the process as the point of reference when the portion actually receives said E-DPCH.

3. The mobile communication system according to claim 1, wherein said modulating/demodulating portion estimates the actual number of retransmissions if a Retransmission Sequence Number (RSN) value to indicate the number of retransmissions of said MAC-e PDU indicates a maximum value that can be displayed.

4. The mobile communication system according to claim 1, said system being a radio network of Wideband-Code Division Multiple Access (W-CDMA) system.

5. A base station device that receives a Medium Access Control (MAC-e) Protocol Data Unit (PDU) from a mobile terminal using a Hybrid Acknowledge Request (HARQ) system in a mobile communication system, the base station device comprising: a modulating/demodulating portion that estimates the number of processes used by said mobile terminal using a Total E-DCH Buffer Status (TBES) of an Enhanced Dedicated Physical Channel (E-DPCH) even if the modulating/demodulating portion cannot receive the E-DPCH and/or cannot correctly decode the MAC-e PDU.

6. The base station device according to claim 5, wherein said modulating/demodulating portion predicts a process for said mobile terminal to transmit said E-DPCH, and estimates the number of retransmissions of said MAC-e PDU using the process as the point of reference when said portion actually receives said E-DPCH.

7. The base station device according to claim 5, wherein said modulating/demodulating portion estimates the actual number of retransmissions if a Retransmission Sequence Number (RSN) value to indicate the number of retransmissions of said MAC-e PDU indicates a maximum value that can be displayed.

8. The base station device according to claim 5, wherein said mobile communication system is a radio network of Wideband-Code Division Multiple Access (W-CDMA) system.

9. A method of estimating the number of uplink packet retransmissions for a mobile communication system wherein a base station device receives a Medium Access Control (MAC-e) Protocol Data Unit (PDU) from a mobile terminal using a Hybrid Acknowledge Request (HARQ) system, the method of estimating the number of uplink packet retransmissions comprising: executing by a modulating/demodulating portion of the base station the treatment of estimating the number of processes used by said mobile terminal using a Total E-DCH Buffer Status (TBES) of an Enhanced Dedicated Physical Channel (E-DPCH) even if the modulating/demodulating portion cannot receive the E-DPCH and/or the cannot correctly decode the MAC-e PDU.

10. The method of estimating the number of uplink packet retransmissions according to claim 9, wherein in said treatment of estimating the number of processes, said base station device predicts a process for said mobile terminal to transmit said E-DPCH, and estimates the number of retransmissions of said MAC-e PDU using the process as the point of reference when the portion actually receives said E-DPCH.

11. The method of estimating the number of uplink packet retransmissions according to claim 9, wherein in said treatment of estimating the number of processes, said base station device estimates the actual number of retransmissions if a Retransmission Sequence Number (RSN) value to indicate the number of retransmissions of said MAC-e PDU indicates a maximum value that can be displayed.

12. The method of estimating the number of uplink packet retransmissions according to claim 9, wherein said mobile communication system is a radio network of Wideband-Code Division Multiple Access (W-CDMA) system.

13. A non-transitory computer readable medium embodied with computer executable instructions to be executed by a base station device in a mobile communication system wherein said base station device receives a Medium Access Control (MAC-e) Protocol Data Unit (PDU) from a mobile terminal using a Hybrid Acknowledge Request (HARQ) system, comprising: computer executable instructions to be executed by a central processing unit of said base station device to execute the treatment of estimating the number of processes used by said mobile terminal using a Total E-DCH Buffer Status (TBES) of an Enhanced Dedicated Physical Channel (E-DPCH) even if the E-DPCH cannot be received and/or the MAC-e PDU cannot be correctly decoded.

* * * * *